(12) United States Patent
Hayes et al.

(10) Patent No.: US 11,321,729 B1
(45) Date of Patent: May 3, 2022

(54) PROMOTION PROCESSING SYSTEM FOR DIGITAL PROMOTION INSERTION INTO RETAILER CHATBOT CONVERSATION AND RELATED METHODS

(71) Applicant: Inmar Clearing, Inc., Winston-Salem, NC (US)

(72) Inventors: Jeffery Hayes, Seattle, WA (US); Gregory Clem, Seattle, WA (US); Nathanael Georgeson, Seattle, WA (US); Samuel May, Kent, WA (US); O'Ryan McEntire, Seattle, WA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 16/919,942

(22) Filed: Jul. 2, 2020

(51) Int. Cl.
  *G06Q 30/00* (2012.01)
  *G06Q 30/02* (2012.01)
  *H04L 51/02* (2022.01)
  *G06Q 30/06* (2012.01)

(52) U.S. Cl.
  CPC ..... *G06Q 30/0222* (2013.01); *G06Q 30/0239* (2013.01); *G06Q 30/0633* (2013.01); *H04L 51/02* (2013.01)

(58) Field of Classification Search
  CPC ........... G06Q 30/0222; G06Q 30/0239; G06Q 30/0633; H04L 51/02
  USPC ...................................................... 705/14.23
  See application file for complete search history.

(56) References Cited

U.S. PATENT DOCUMENTS

| 10,068,284 B1 | 9/2018 | Zisk et al. | |
|---|---|---|---|
| 2007/0290038 A1* | 12/2007 | Woodcock | H04L 67/04 235/383 |
| 2014/0006163 A1 | 1/2014 | Sengupta et al. | |

(Continued)

FOREIGN PATENT DOCUMENTS

| WO | 2018034494 A1 | 2/2018 |
|---|---|---|
| WO | 2018214163 A1 | 11/2018 |

OTHER PUBLICATIONS

M. Nuruzzaman and O. K. Hussain, "A Survey on Chatbot Implementation in Customer Service Industry through Deep Neural Networks," 2018 IEEE 15th International Conference on e-Business Engineering (ICEBE), 2018, pp. 54-61, doi: 10.1109/ICEBE.2018. 00019. (Year: 2018).*

*Primary Examiner* — Sun M Li
(74) *Attorney, Agent, or Firm* — Allen, Dyer, Doppelt + Gilchrist, P.A.

(57) ABSTRACT

A system may include a chatbot communications server executing a given chatbot conversation associated with a given retailer from among retailers. The system may also include a remote device associated with a given user, and a promotions processing server. The promotions processing server may be configured to store digital promotions for the retailers, and communicate at least one digital promotion corresponding to the given retailer to the chatbot communications server. The chatbot communications server may be configured to insert the at least one digital promotion into the given chatbot conversation to be displayed on the remote device. The chatbot conversation may permit the given user to clip at least one selected digital promotion, and add a product for purchase corresponding to the at least one selected digital promotion to a virtual shopping cart.

26 Claims, 9 Drawing Sheets

(56) References Cited

U.S. PATENT DOCUMENTS

| | | | |
|---|---|---|---|
| 2014/0074649 A1* | 3/2014 | Patel | G06Q 30/0631 |
| | | | 705/26.7 |
| 2018/0358010 A1* | 12/2018 | Eidem | G10L 15/1815 |
| 2019/0007381 A1* | 1/2019 | Isaacson | G06Q 50/01 |
| 2020/0050519 A1* | 2/2020 | Vaughn | G06N 5/02 |

* cited by examiner

PROMOTION PROCESSING SYSTEM FOR DIGITAL PROMOTION INSERTION INTO RETAILER CHATBOT CONVERSATION AND RELATED METHODS

TECHNICAL FIELD

The present invention relates to the field of electronics, and more particularly, to chatbot based communications and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

An electronic messenger program or instant messenger is a computer program that permits real time text transmission over a computer network, for example, the Internet. One type of electronic messenger program or instant messenger is a chat or chatbot, which is a computer program that provides conversation, for example, by way of text. The conversation may mimic human conversation. A chatbot may be particularly useful for customer service or information acquisition applications.

SUMMARY

A system may include a chatbot communications server executing a given chatbot conversation associated with a given retailer from among a plurality thereof. The system may also include a remote device associated with a given user, and a promotions processing server. The promotions processing server may be configured to store a plurality of digital promotions for the plurality of retailers, and communicate at least one digital promotion corresponding to the given retailer to the chatbot communications server. The chatbot communications server may be configured to insert the at least one digital promotion into the given chatbot conversation to be displayed on the remote device. The chatbot conversation may permit the given user to clip at least one selected digital promotion, and add a product for purchase corresponding to the at least one selected digital promotion to a virtual shopping cart.

The chatbot communications server may be configured to permit the given user to process payment of the product for purchase in the virtual shopping cart. The chatbot communications server may be configured to insert a recipe into the given chatbot conversation to be displayed on the remote device, for example.

The recipe may have a plurality of ingredients, and the chatbot conversation may permit the given user to add the plurality of ingredients to the virtual shopping cart. The recipe may have a plurality of ingredients, and the at least one digital promotion may be for one of the plurality of ingredients, for example.

The remote device may include an input device and a processor coupled thereto. The chatbot conversation may permit the given user to clip at least one selected digital promotion based upon input to the input device, for example.

The promotions processing server may be configured to maintain the virtual shopping cart, for example. The remote device may include a mobile wireless communications device.

A method aspect is directed to a method of processing a promotion. The method may include using a promotions processing server to store a plurality of digital promotions for a plurality of retailers, and communicate at least one digital promotion corresponding to a given retailer to a chatbot communications server executing a given chatbot conversation associated with the given retailer from among the plurality thereof so that the chatbot communications server inserts the at least one digital promotion into the given chatbot conversation to be displayed on a remote device associated with a given user. The chatbot conversation may permit the given user to clip at least one selected digital promotion, and add a product for purchase corresponding to the at least one selected digital promotion to a virtual shopping cart.

Another method aspect is directed to a method of processing a promotion. The method may include using a chatbot communications server to execute a given chatbot conversation associated with a given retailer from among a plurality thereof, and insert at least one digital promotion from among a plurality thereof for the plurality of retailers into the given chatbot conversation to be displayed on a remote device. The at least one digital promotion may correspond to the given retailer and may be communicated from a promotions processing server storing the plurality of digital promotions. The chatbot conversation may permit the given user to clip at least one selected digital promotion, and may add a product for purchase corresponding to the at least one selected digital promotion to a virtual shopping cart.

A computer readable medium aspect is directed to a non-transitory computer readable medium for processing a promotion. The non-transitory computer readable medium includes computer executable instructions that when executed by a processor of a promotions processing server cause the processor to perform operations. The operations may include storing a plurality of digital promotions for a plurality of retailers and communicating at least one digital promotion corresponding to a given retailer to a chatbot communications server executing a given chatbot conversation associated with the given retailer from among the plurality thereof so that the chatbot communications server inserts the at least one digital promotion into the given chatbot conversation to be displayed on a remote device associated with a given user. The chatbot conversation may permit the given user to clip at least one selected digital promotion, and add a product for purchase corresponding to the at least one selected digital promotion to a virtual shopping cart.

Another computer readable medium aspect is directed to a non-transitory computer readable medium for processing a promotion. The non-transitory computer readable medium includes computer executable instructions that when executed by a processor of a chatbot communications server cause the processor to perform operations. The operations may include executing a given chatbot conversation associated with a given retailer from among a plurality thereof, and inserting at least one digital promotion from among a plurality thereof for the plurality of retailers into the given chatbot conversation to be displayed on a remote device. The at least one digital promotion may correspond to the given retailer and be communicated from a promotions processing server storing the plurality of digital promotions. The chatbot conversation may permit the given user to clip at least one selected digital promotion, and add a product for purchase corresponding to the at least one selected digital promotion to a virtual shopping cart.

DETAILED DESCRIPTION

Figure 1:
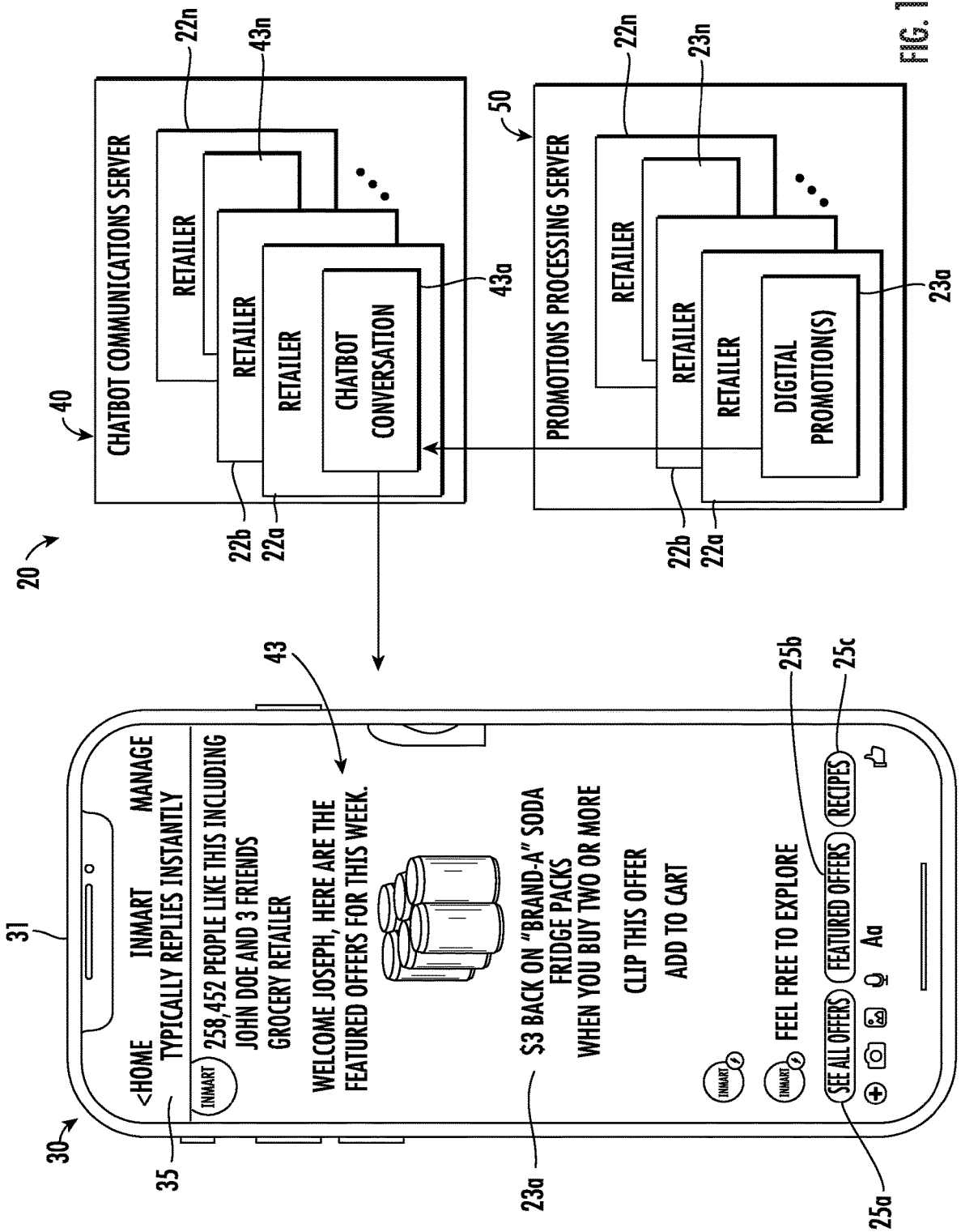
FIG. 1 is a schematic diagram of a promotion processing system in accordance with an embodiment.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-6, a system for processing a promotion 20 includes a remote device 30 associated with a given user. The remote device 30 is illustratively in the form of a mobile wireless communications device and includes a portable housing 31, a mobile device processor 32, a mobile device memory 33 coupled to the mobile device processor, and wireless communications circuitry 34 coupled to the mobile device processor. The mobile wireless communications device 30 also includes a display 35 and an input device 36 carried by the portable housing 31 and coupled to the mobile device processor 32. The display 35 and the input device 36 together may define a touch display. The mobile wireless communications device 30 may include other types of input devices, such as, for example, pushbutton, audio input devices, etc. The mobile wireless communications device 30 may be a mobile phone or smartphone, a tablet computer, or other type of mobile wireless communications device, as will be appreciated by those skilled in the art.

The promotion processing system 20 also includes a chatbot communications server 40. The chatbot communications server include a processor 41 and an associated memory 42. While operations of the chatbot communications server 40 are described herein, it should be understood that the operations of chatbot communications server are performed through cooperation of the processor 41 and the memory 42.

The chatbot communications server 40 executes a given chatbot conversation 43. The given chatbot conversation 43 is associated with a given retailer 22a from among multiple, for example, different retailers 22a-22n. The chatbot communications server 40 may implement the chatbot conversation 43 in the form of a two-way dialog box that permits the given user to communicate by way of typing (i.e., written communication). In some embodiments, the chatbot conversation 43 may be executed or carried out through voice commands or spoken words.

The chatbot conversation 43 is executed by the chatbot communications server 40 and displayed on the mobile wireless communications device 30. Those skilled in the art will appreciate that the chatbot conversation 43 may be initiated by way of user input (e.g., via a prompt, clicking on an icon or link, etc., which may be within an application) to the mobile wireless communications device 30. In some embodiments, the chatbot conversation 43 may self-initiate through an application.

The chatbot conversation 43 may be customized or personalized for the given user. More particularly, through cooperation of the remote device 30 and the chatbot communications server 40, user data or metadata (e.g., user's name), may be retrieved and used within the chatbot conversation 43. Of course, if the given user may be considered logged-in to an associated application, such as, for example, associated with the given retailer or a social media application, the user data may be retrieved via that respective application.

The promotion processing system 20 also includes a promotions processing server 50. The promotions processing server 50 includes a processor 51 and an associated memory 52. While operations of the promotions processing server 50 are described herein, it should be understood that the operations of promotions processing server are performed through cooperation of the processor 51 and the memory 52.

Figure 7:
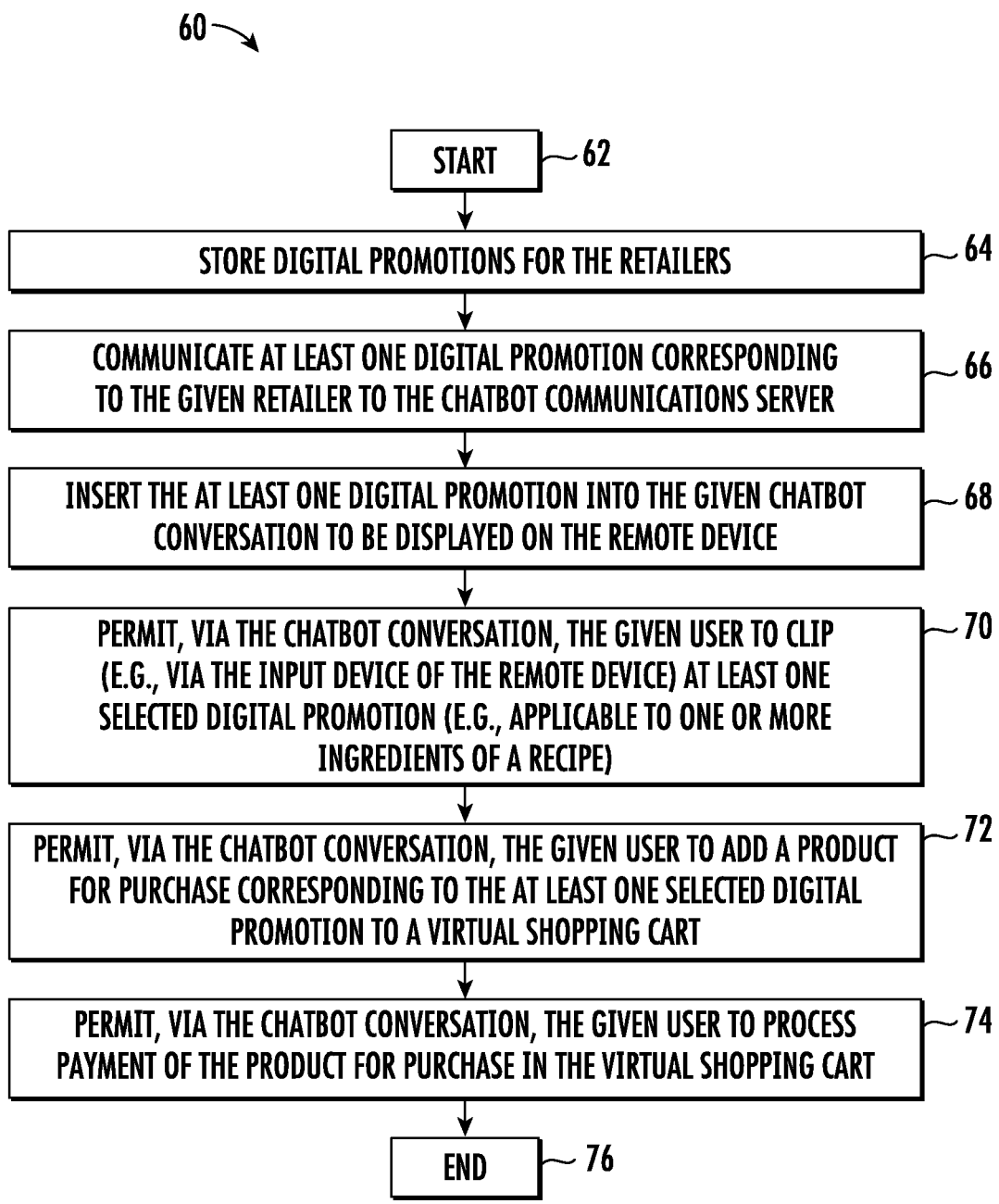
FIG. 7 is a flow diagram of operation of the chatbot communications server and promotions processing server of the promotion processing system of FIG. 6.

Referring now to the flowchart 60 in FIG. 7, beginning at Block 62, operations of the promotion processing system 20 with respect to the promotions processing server 50 and the chatbot communications server 40 will now be described. At Block 64, the promotions processing server 50 stores digital promotions 23a-23n for the retailers 22a-22n, for example, in the memory 52. The promotions processing server 50 communicates one of the digital promotions 23a-23n corresponding to the given retailer 22a to the chatbot communications server 40 (Block 66). The promotions processing server 50 may communicate more than one digital promotion 23a-23n to the chatbot communications server 40.

Figure 3:
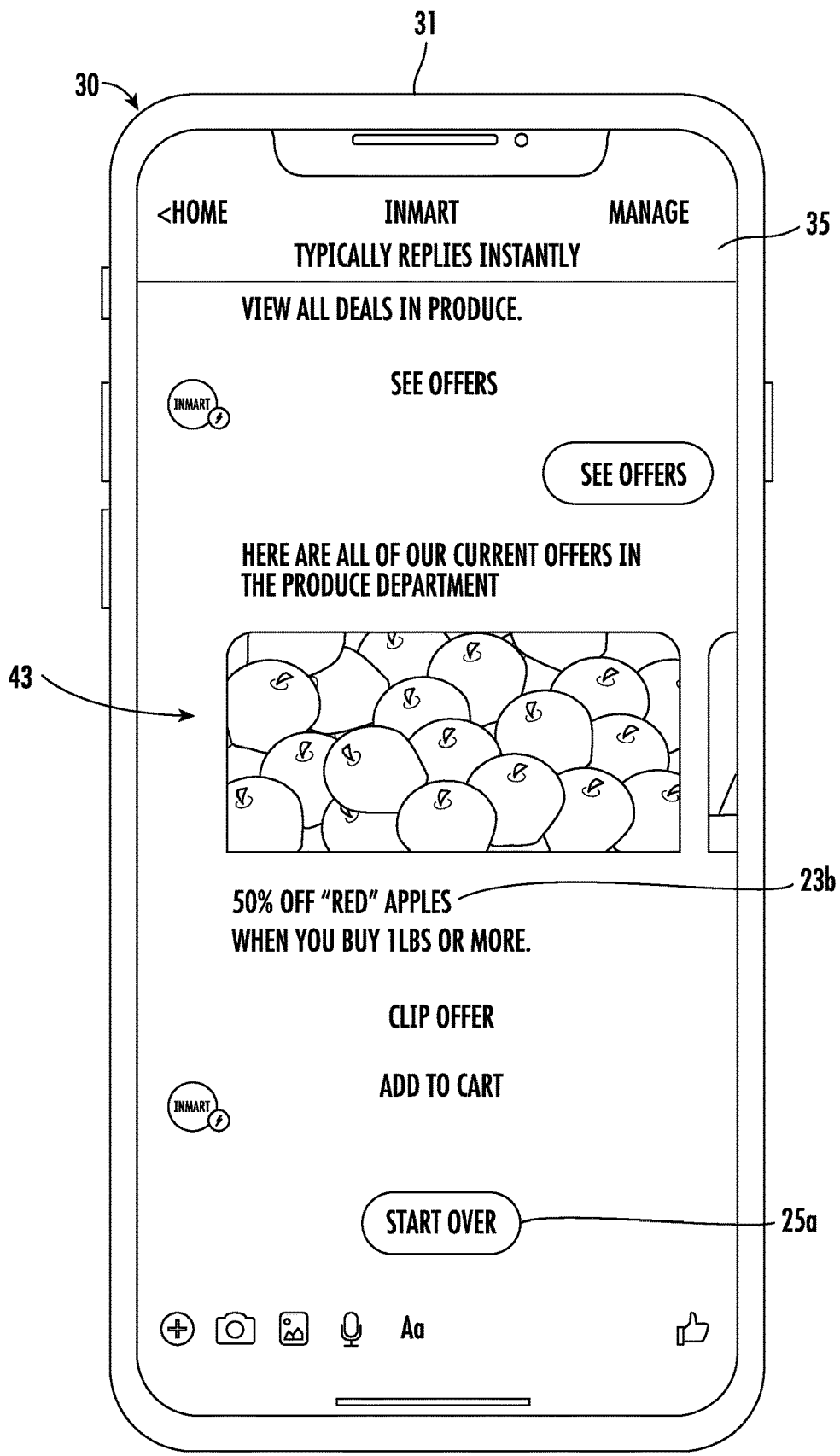
FIG. 3 is another screenshot diagram of a display of a remote device operating in accordance with an embodiment.
Figure 4:
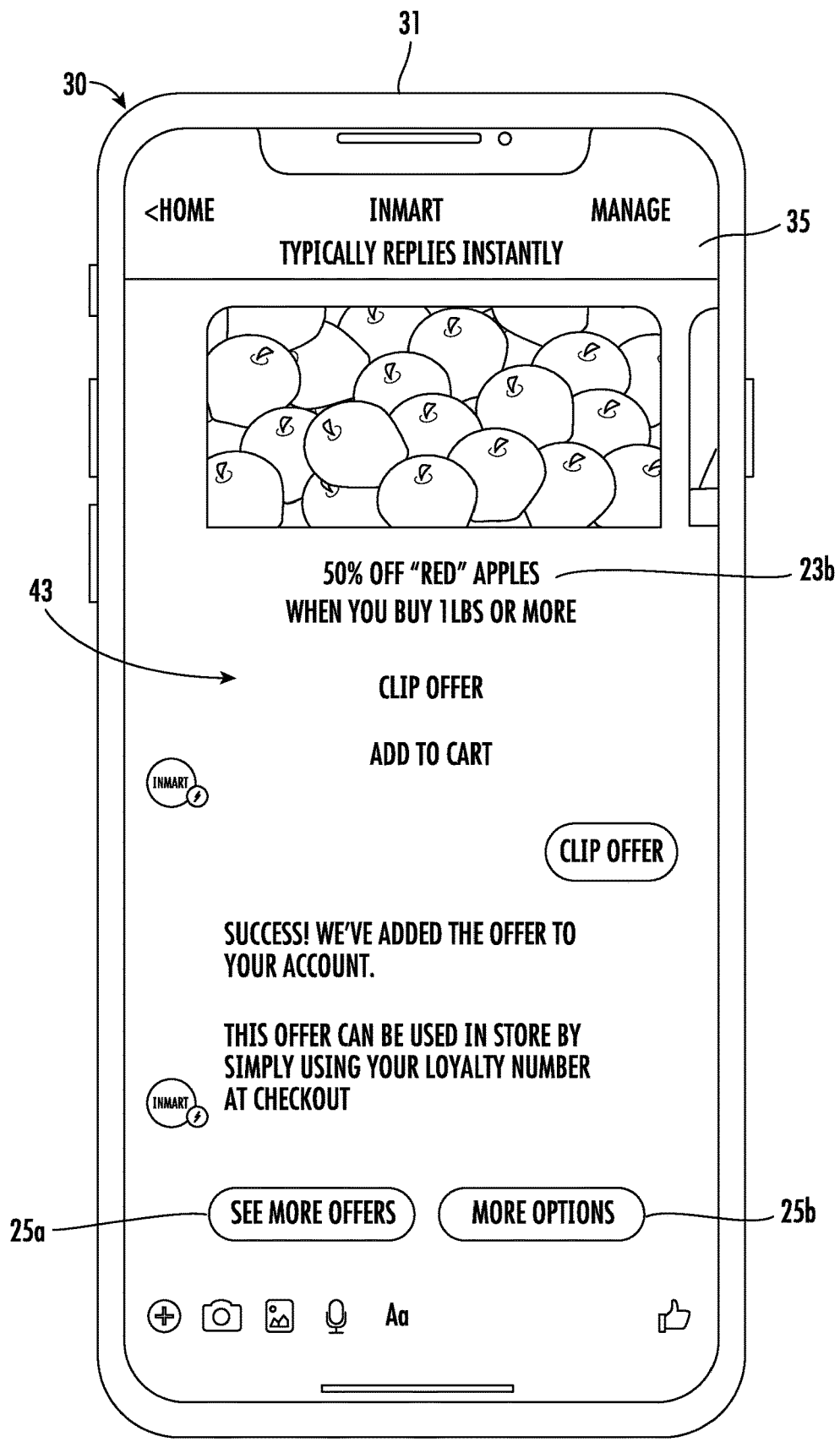
FIG. 4 is another screenshot diagram of a display of a remote device operating in accordance with an embodiment.
Figure 5:
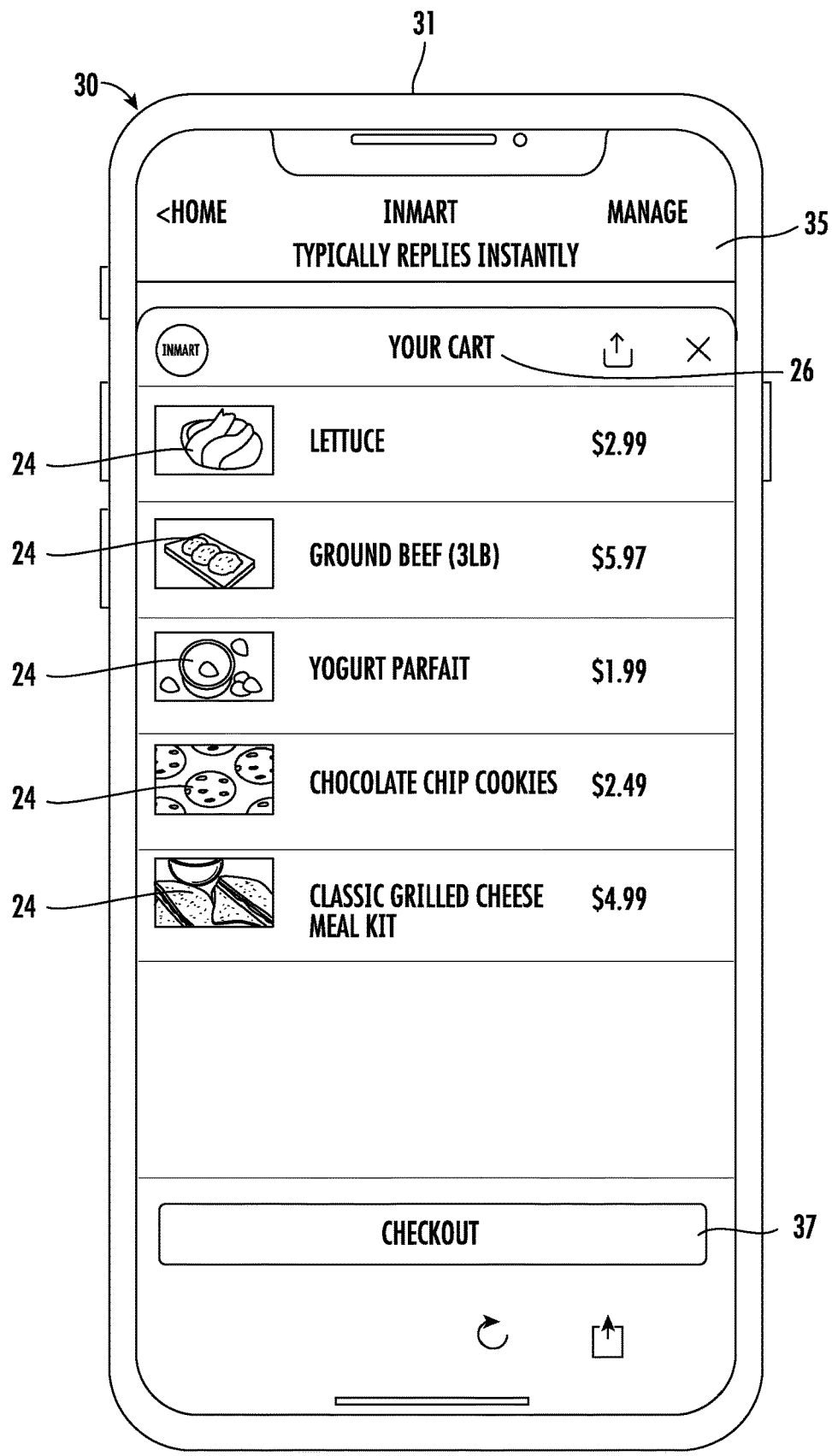
FIG. 5 is another screenshot diagram of a display of a remote device operating in accordance with an embodiment.
Figure 6:
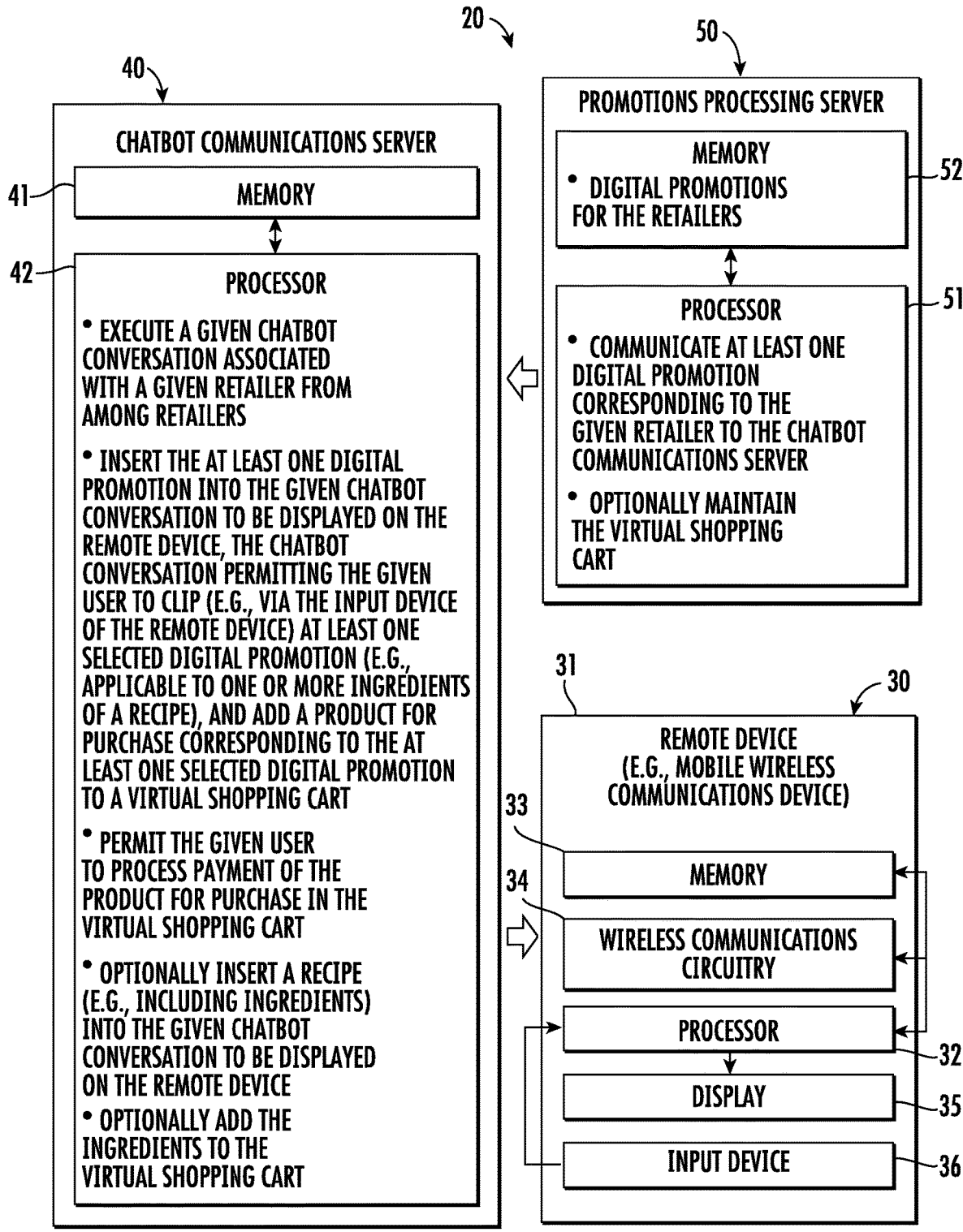
FIG. 6 is a schematic block diagram of a promotion processing system in accordance with an embodiment.

The chatbot communications server 40, upon receipt of the digital promotion 23a, for example, inserts the digital promotion into the given chatbot conversation 43 to be displayed on the remote device 30 (e.g., on the display 35 of the remote device) (Block 68). Multiple digital promotions 23a-23n may be inserted into the chatbot conversation 43 and may be organized by product type (e.g., produce, meat, etc.). Illustratively, in an exemplary implementation, a digital promotion 23*a* is for $3 back on "Brand-A" Soda Fridge Packs when you buy two or more (FIGS. 1 and 2), and another digital promotion 23*b* is for 50% off "Red" apples when you buy 1-lb. or more (FIGS. 3 and 4).

The chatbot conversation 43, by way of execution on the chatbot communications server 40, permits the given user to clip a selected digital promotion 22*a* (Block 70), for example, to a digital wallet associated with a loyalty account of the given user, and/or add a product for purchase 24 corresponding to the selected digital promotion to a virtual shopping cart 26 (e.g., with or without clipping the corresponding digital promotion) (Block 72). The virtual shopping cart 26 may be processed or maintained by the promotions processing server 50. Of course, in some embodiments, the virtual shopping cart 26 may be processed by the chatbot communications server 40 or a remote server for processing online or e-commerce purchases through the chatbot conversation 43. In some embodiments, the functions of the chatbot communications server 40 and the promotions processing server 50 may be performed by a single physical server or computer.

Clipping (Block 70) and adding products to the virtual shopping cart 26 (Block 72) may be performed by providing input, for example, via the input device 36 or touch display. Dialog boxes 25*a*-25*c* within the chatbot conversation 43 may provide predetermined responses for questions or communications in chatbot conversation. Other and/or additional products, for example, those not having an associated digital promotion, may be added to the virtual shopping cart 26 for the given retailer 22*a*.

At Block 74, the chatbot communications server 40 permits the given user to process payment of the product, or products, for purchase 24 in the virtual shopping cart 26. More particularly, the chatbot communications server 40, via input or the chatbot conversation 43, permits the user to apply payment (e.g. stored in an account associated with the given user, such as a loyalty account) for the purchase of the products 24 (e.g., via the process payment or checkout input icon 37 on the display 35 of the remote device 30 (FIG. 5)). The given user may, of course, provide the payment method via input to the remote device 30 or, more particularly, via the chatbot conversation 43.

Figure 2:
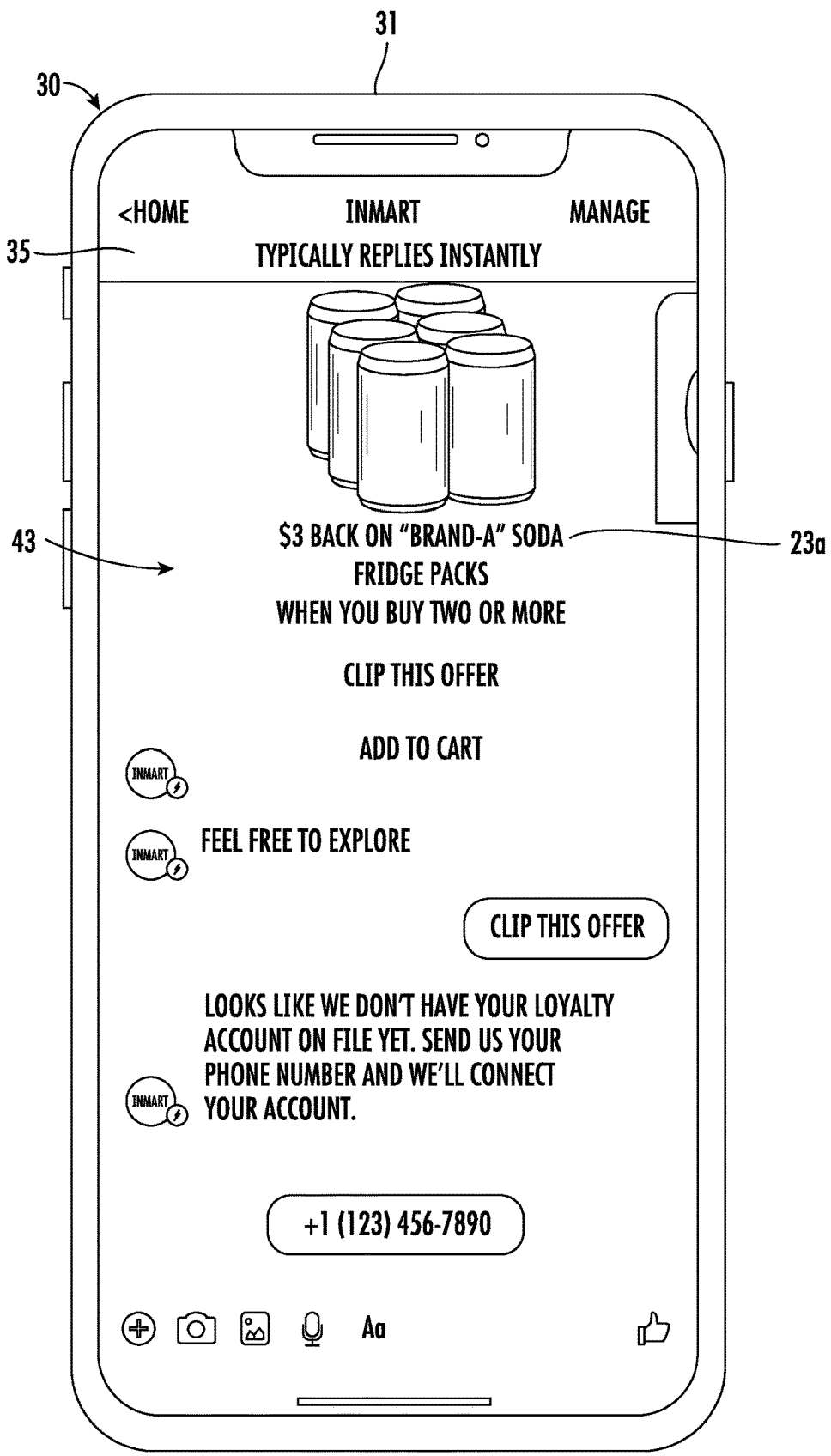
FIG. 2 is a screenshot diagram of a display of a remote device operating in accordance with an embodiment.

The given user, if the given user's account is not yet associated with the chatbot conversation 43, may be prompted to supply an identifier, for example, a phone number, to associate the given user's account with the chatbot conversation (FIG. 2). As will be understood by those skilled in the art, upon payment, the products for purchase 24 and confirmation of payment may be communicated to the retailer 22*a*-22*n* for picking, and the given user may pick up the purchased products or have the purchased products delivered. In other words, the promotion processing system 20 may be considered an e-commerce or online platform for ordering and purchasing products along with processing digital promotions 23*a*-23*n* via the chatbot conversation 43.

Figure 8:
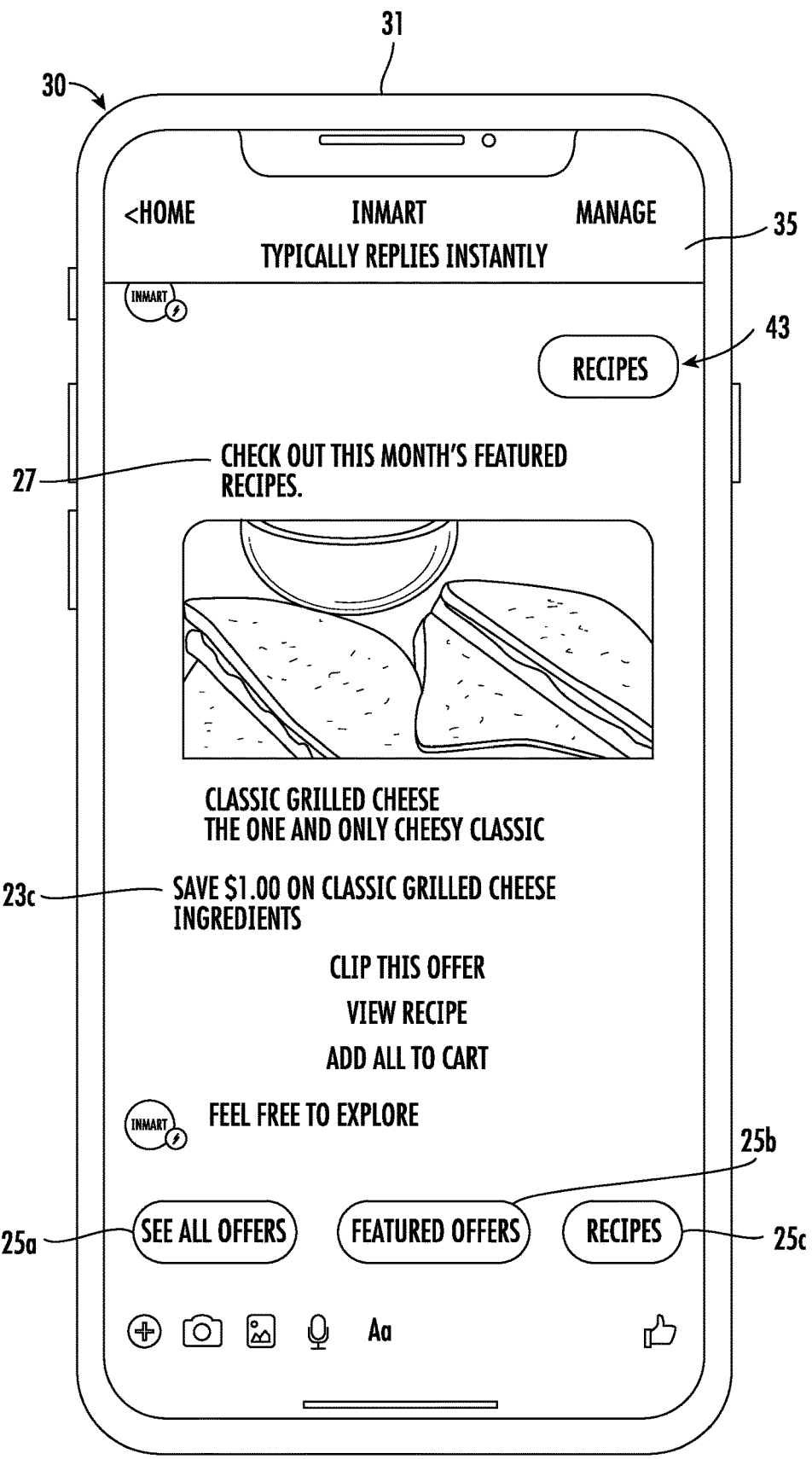
FIG. 8 is a screenshot diagram of a display of a remote device operating in accordance with an embodiment.
Figure 9:
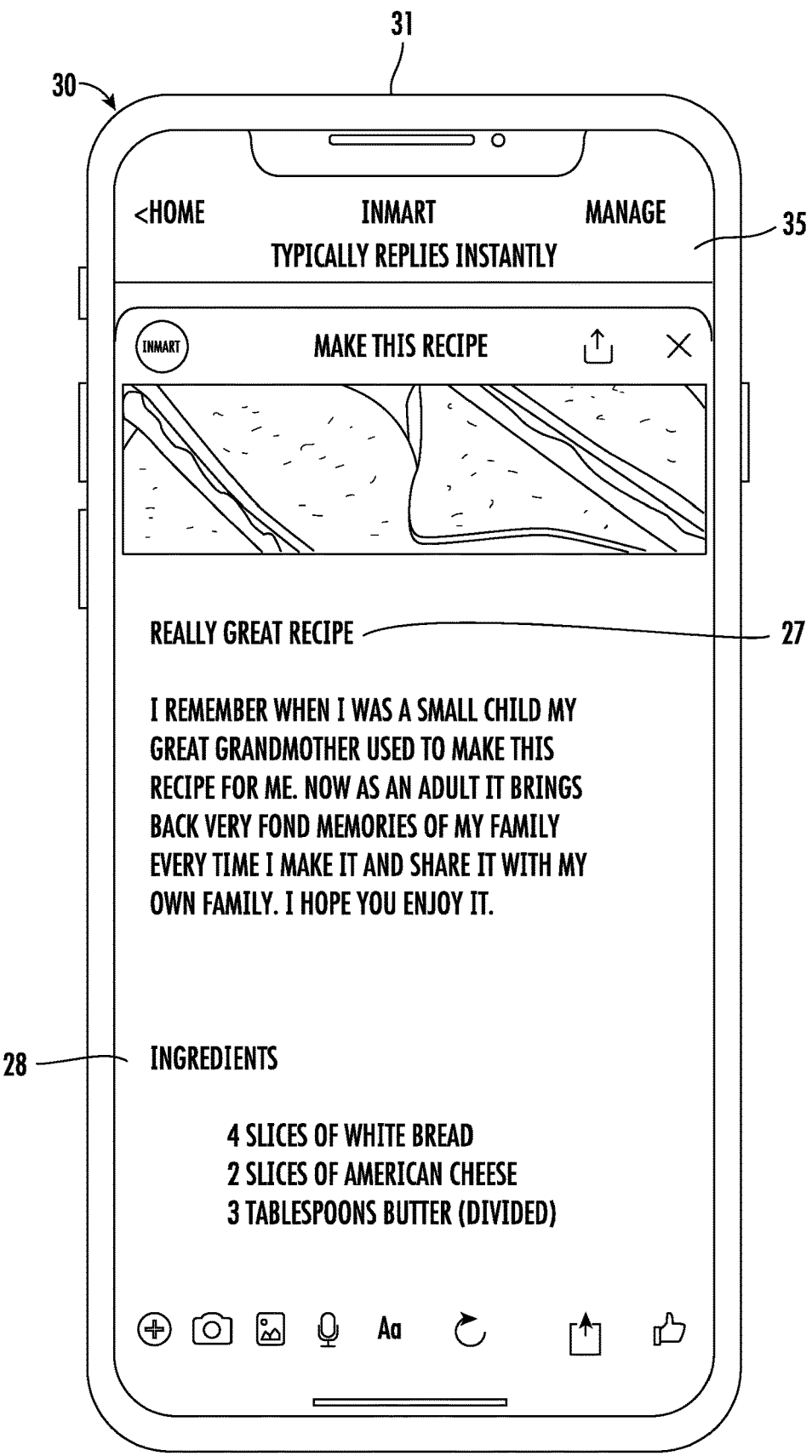
FIG. 9 is another screenshot diagram of a display of a remote device operating in accordance with an embodiment.

Referring now to FIGS. 8 and 9, in some embodiments, the chatbot communications server 40 may insert a recipe 27 into the given chatbot conversation 43. The recipe 27 is to be displayed on the remote device 30, for example, the display 35 of the remote device (FIG. 9). The recipe 27 includes ingredients 28. The chatbot conversation 43 permits the given user to add the ingredients 28 to the virtual shopping cart 26. For example, the chatbot conversation 43 may permit the given user to add the ingredients individually or as a whole (i.e., all the ingredients of the recipe, for example, with a single input). In some embodiments, the recipe 27 may be considered or be available as a meal kit, and thus, the given user may add the recipe 27, as a meal kit (FIGS. 5 and 8), to the virtual shopping cart.

The digital promotion 23*c* may be for or applicable to the recipe 27 (FIG. 8), for example, as a meal kit, or to any one or more of the ingredients. For example, in the exemplary implementation, the recipe 27 is for classic grilled cheese and the ingredients 28 include white bread, American cheese, and butter. Accordingly, the digital promotion may be for white bread. The digital promotion may be for the purchase of white bread and American cheese. Alternatively, there may be more than one digital promotion 23*a*-23*n* for each ingredient 28. Operations end at Block 76.

A method aspect is directed to a method of processing a promotion. The method includes using a promotions processing server 50 to store a plurality of digital promotions 23*a*-23*n* for a plurality of retailers 22*a*-22*n*, and communicate at least one digital promotion corresponding to a given retailer to a chatbot communications server 40 executing a given chatbot conversation 43 associated with the given retailer 22*a* from among the plurality thereof so that the chatbot communications server inserts the at least one digital promotion into the given chatbot conversation to be displayed on a remote device 30 associated with a given user. The chatbot conversation 43 permits the given user to clip at least one selected digital promotion 23*a*, and add a product for purchase 24 corresponding to the at least one selected digital promotion to a virtual shopping cart 26.

Another method aspect is directed to a method of processing a promotion. The method includes using a chatbot communications server 40 to execute a given chatbot conversation 43 associated with a given retailer 22*a* from among a plurality thereof, and insert at least one digital promotion 23*a* from among a plurality thereof for the plurality of retailers 22*a*-22*n* into the given chatbot conversation to be displayed on a remote device 30. The at least one digital promotion 23*a* corresponds to the given retailer 22*a* and may be communicated from a promotions processing server 50 storing the plurality of digital promotions 23*a*-23*n*. The chatbot conversation 43 permits the given user to clip at least one selected digital promotion 23*a*, and add a product for purchase 24 corresponding to the at least one selected digital promotion to a virtual shopping cart 26.

A computer readable medium aspect is directed to a non-transitory computer readable medium for processing a promotion. The non-transitory computer readable medium includes computer executable instructions that when executed by a processor 51 of a promotions processing server 50 cause the processor to perform operations. The operations include storing a plurality of digital promotions 23*a*-23*n* for a plurality of retailers 22*a*-22*n* and communicating at least one digital promotion 23*a* corresponding to a given retailer 22*a* to a chatbot communications server 40 executing a given chatbot conversation 43 associated with the given retailer from among the plurality thereof so that the chatbot communications server inserts the at least one digital promotion into the given chatbot conversation to be displayed on a remote device 30 associated with a given user. The chatbot conversation permits the given user to clip at least one selected digital promotion 23*a*, and add a product for purchase 24 corresponding to the at least one selected digital promotion to a virtual shopping cart 26.

Another computer readable medium aspect is directed to a non-transitory computer readable medium for processing a promotion. The non-transitory computer readable medium includes computer executable instructions that when executed by a processor 41 of a chatbot communications server 40 cause the processor to perform operations. The operations include executing a given chatbot conversation 43 associated with a given retailer 22a from among a plurality thereof, and inserting at least one digital promotion 23a from among a plurality thereof for the plurality of retailers 22a-22n into the given chatbot conversation to be displayed on a remote device 30. The at least one digital promotion 23a corresponding to the given retailer 22a and being communicated from a promotions processing server 50 storing the plurality of digital promotions 23a-23n. The chatbot conversation 43 permits the given user to clip at least one selected digital promotion 23a, and add a product for purchase 24 corresponding to the at least one selected digital promotion to a virtual shopping cart 26.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system comprising:
   a remote device associated with a given user and configured to execute an application;
   a chatbot communications server configured to
      cooperate with the remote device to obtain metadata associated with the given user, and
      execute, via a chatbot within the application on the remote device, a given chatbot conversation associated with a given retailer from among a plurality thereof, the chatbot conversation being executed based upon the metadata and implemented in a form of a two-way dialog that permits the given user to communicate with the chatbot by providing input to the remote device; and
   a promotions processing server configured to
      store a plurality of digital coupons for the plurality of retailers, and
      communicate at least one digital coupon corresponding to the given retailer to the chatbot communications server,
   said chatbot communications server configured to
      insert the at least one digital coupon into the given chatbot conversation to be displayed on the remote device via the application,
      execute, via the chatbot within the application on the remote device, the chatbot conversation to prompt the given user to, obtain an identifier for accessing a loyalty account associated with the given user at the given retailer based upon determining that the loyalty account is not associated with the chatbot conversation, provide input to select a predetermined response to clip at least one selected digital coupon to a digital wallet associated with the loyalty account of the given user, and add a product for purchase corresponding to the at least one selected digital coupon to a virtual shopping cart, respectively, and permit, via the chatbot within the application on the remote device, the given user to process payment of the product for purchase in the virtual shopping cart based upon a stored payment method associated with the loyalty account.

2. The promotion processing system of claim 1 wherein the chatbot communications server is configured to insert a recipe into the given chatbot conversation to be displayed on the remote device.

3. The promotion processing system of claim 2 wherein the recipe has a plurality of ingredients; and wherein the chatbot conversation permits the given user to add the plurality of ingredients to the virtual shopping cart.

4. The promotion processing system of claim 2 wherein the recipe has a plurality of ingredients; and wherein the at least one digital coupon is for one of the plurality of ingredients.

5. The promotion processing system of claim 1 wherein the remote device comprises an input device and a processor coupled thereto; and wherein the chatbot conversation prompts the given user to provide input to select the predetermined response based upon input to the input device.

6. The promotion processing system of claim 1 wherein the promotions processing server is configured to maintain the virtual shopping cart.

7. The promotion processing system of claim 1 wherein the remote device comprises a mobile wireless communications device.

8. A promotions processing server for a promotion processing system comprising a remote device associated with a given user and configured to execute an application and a chatbot communications server configured to cooperate with the remote device to obtain metadata associated with the given user, and execute, via a chatbot within the application on the remote device, a given chatbot conversation associated with a given retailer from among a plurality thereof, the chatbot conversation being executed based upon the metadata and implemented in a form of a two-way dialog that permits the given user to communicate with the chatbot by providing input to the remote device, the promotions processing server comprising:
   a processor and an associated memory configured to
      store a plurality of digital coupons for the plurality of retailers, and
      communicate at least one digital coupon corresponding to the given retailer to the chatbot communications server so that the chatbot communications server inserts the at least one digital coupon into the given chatbot conversation to be displayed on the remote device via the application, executes, via the chatbot within the application on the remote device, the chatbot conversation to prompt the given user to, obtain an identifier for accessing a loyalty account associated with the given user at the given retailer based upon determining that the loyalty account is not associated with the chatbot conversation, provide input to select a predetermined response to clip at least one selected digital coupon to a digital wallet associated with the loyalty account of the given user, and add a product for purchase corresponding to the at least one selected digital coupon to a virtual shopping cart, respectively, and permit, via the chatbot within the application on the remote device, the given user to process payment of the product for purchase in the virtual shopping cart based upon a stored payment method associated with the loyalty account.

9. The promotions processing server of claim 8 wherein the processor is configured to maintain the virtual shopping cart.

10. A chatbot communications server for a promotion processing system comprising a remote device associated with a given user and configured to execute an application, and a promotions processing server configured to store a plurality of digital coupons for a plurality of retailers and communicate at least one digital coupon corresponding to a given retailer to the chatbot communications server, the chatbot communications server comprising:
a processor and an associated memory configured to
cooperate with the remote device to obtain metadata associated with the given user,
execute, via a chatbot within the application on the remote device, a given chatbot conversation associated with the given retailer, the chatbot conversation being executed based upon the metadata and implemented in a form of a two-way dialog that permits the given user to communicate with the chatbot by providing input to the remote device,
insert the at least one digital coupon into the given chatbot conversation to be displayed on the remote device via the application,
execute, via the chatbot within the application on the remote device, the chatbot conversation to prompt the given user to, obtain an identifier for accessing a loyalty account associated with the given user at the given retailer based upon determining that the loyalty account is not associated with the chatbot conversation, provide input to select a predetermined response to clip at least one selected digital coupon to a digital wallet associated with the loyalty account of the given user, and add a product for purchase corresponding to the at least one selected digital coupon to a virtual shopping cart, respectively, and
permit, via the chatbot within the application on the remote device, the given user to process payment of the product for purchase in the virtual shopping cart based upon a stored payment method associated with the loyalty account.

11. The chatbot communications server of claim 10 wherein the processor is configured to insert a recipe into the given chatbot conversation to be displayed on the remote device.

12. The chatbot communications server of claim 11 wherein the recipe has a plurality of ingredients; and wherein the chatbot conversation permits the given user to add the plurality of ingredients to the virtual shopping cart.

13. The chatbot communications server of claim 11 wherein the recipe has a plurality of ingredients; and wherein the at least one digital coupon is for one of the plurality of ingredients.

14. The chatbot communications server of claim 10 wherein the remote device comprises an input device and a processor coupled thereto; and wherein the chatbot conversation prompts the given user to provide input to select the predetermined response to clip at least one selected digital promotion based upon input to the input device.

15. A method of processing a promotion comprising:
using a promotions processing server to
store a plurality of digital coupons for a plurality of retailers, and
communicate at least one digital coupon corresponding to a given retailer to a chatbot communications server configured to cooperate with a remote device associated with a given user to obtain metadata associated with the given user, and execute, via a chatbot within an application on the remote device, a given chatbot conversation associated with the given retailer from among the plurality thereof, the chatbot conversation being executed based upon the metadata and implemented in a form of a two-way dialog that permits the given user to communicate with the chatbot by providing input to the remote device and so that the chatbot communications server inserts the at least one digital coupon into the given chatbot conversation to be displayed on the remote device via the application, executes, via the chatbot within the application of the remote device, the chatbot conversation to prompt the given user to, obtain an identifier for accessing a loyalty account associated with the given user at the given retailer based upon determining that the loyalty account is not associated with the chatbot conversation, provide input to select a predetermined response to clip at least one selected digital coupon to a digital wallet associated with the loyalty account of the given user and add a product for purchase corresponding to the at least one selected digital coupon to a virtual shopping cart, respectively, and permits, via the chatbot within the application on the remote device, the given user to process payment of the product for purchase in the virtual shopping cart based upon a stored payment method associated with the loyalty account.

16. The method of claim 15 wherein using the promotions processing server comprises using the promotions processing server to maintain the virtual shopping cart.

17. A method of processing a promotion comprising:
using a chatbot communications server to
cooperate with a remote device associated with a given user to obtain metadata associated with the given user,
execute, via a chatbot within an application on the remote device, a given chatbot conversation associated with a given retailer from among a plurality thereof, the chatbot conversation being executed based upon the metadata and implemented in a form of a two-way dialog that permits the given user to communicate with the chatbot by providing input to the remote device,
insert at least one digital coupon from among a plurality thereof for the plurality of retailers into the given chatbot conversation to be displayed on the remote device via the application, the at least one digital coupon corresponding to the given retailer and being communicated from a promotions processing server storing the plurality of digital coupons,
execute, via the chatbot within the application on the remote device, the chatbot conversation to prompt the given user to, obtain an identifier for accessing a loyalty account associated with the given user at the given retailer based upon determining that the loyalty account is not associated with the chatbot conversation, provide input to select a predetermined response to clip at least one selected digital coupon to a digital wallet associated with the loyalty account of the given user, and add a product for purchase corresponding to the at least one selected digital promotion to a virtual shopping cart, respectively, and
permit, via the chatbot within the application on the remote device, the given user to process payment of the product for purchase in the virtual shopping cart based upon a stored payment method associated with the loyalty account.

18. The method of claim 17 wherein using the chatbot communications server comprises using the chatbot communications server to insert a recipe into the given chatbot conversation to be displayed on the remote device.

19. The method of claim 18 wherein the recipe has a plurality of ingredients; and wherein the chatbot conversation permits the given user to add the plurality of ingredients to the virtual shopping cart.

20. The method of claim 18 wherein the recipe has a plurality of ingredients; and wherein the at least one digital coupon is for one of the plurality of ingredients.

21. A non-transitory computer readable medium for processing a promotion, the non-transitory computer readable medium comprising computer executable instructions that when executed by a processor of a promotions processing server cause the processor to perform operations comprising:
storing a plurality of digital coupons for a plurality of retailers; and
communicating at least one digital coupon corresponding to a given retailer to a chatbot communications server configured to cooperate with a remote device associated with a given user to obtain metadata associated with the given user, and execute, via a chatbot within an application on the remote device, a given chatbot conversation associated with the given retailer from among the plurality thereof, the chatbot conversation being executed based upon the metadata and implemented in a form of a two-way dialog that permits the given user to communicate with the chatbot by providing input to the remote device and so that the chatbot communications server inserts the at least one digital coupon into the given chatbot conversation to be displayed on the remote device, via the application, executes, via the chatbot within the application on the remote device, the chatbot conversation to prompt the given user to, obtain an identifier for accessing a loyalty account associated with the given user at the given retailer based upon determining that the loyalty account is not associated with the chatbot conversation, provide input to select a predetermined response to clip at least one selected digital coupon to a digital wallet associated with the loyalty account of the given users, and add a product for purchase corresponding to the at least one selected digital coupon to a virtual shopping cart, respectively, and permits, via the chatbot within the application on the remote device, the given user to process payment of the product for purchase in the virtual shopping cart based upon a stored payment method associated with the loyalty account.

22. The non-transitory computer readable medium of claim 21 wherein the operations comprise maintaining the virtual shopping cart.

23. A non-transitory computer readable medium for processing a promotion, the non-transitory computer readable medium comprising computer executable instructions that when executed by a processor of a chatbot communications server cause the processor to perform operations comprising:
cooperating with a remote device associated with a given user to obtain metadata associated with the given user,
executing, via a chatbot within an application on the remote device, a given chatbot conversation associated with a given retailer from among a plurality thereof, the chatbot conversation being executed based upon the metadata and implemented in a form of a two-way dialog that permits the given user to communicate with the chatbot by providing input to the remote device,
inserting at least one digital coupon from among a plurality thereof for the plurality of retailers into the given chatbot conversation to be displayed on the remote device via the application, the at least one digital coupon corresponding to the given retailer and being communicated from a promotions processing server storing the plurality of digital coupons,
executing, via the chatbot within the application on the remote device, the chatbot conversation to prompt the given user to, obtain an identifier for accessing a loyalty account associated with the given user at the given retailer based upon determining that the loyalty account is not associated with the chatbot conversation, provide input to select a predetermined response to clip at least one selected digital coupon to a digital wallet associated with the loyalty account of the given user and, add a product for purchase corresponding to the at least one selected digital promotion to a virtual shopping cart, respectively, and
permitting, via the chatbot within the application on the remote device, the given user to process payment of the product for purchase in the virtual shopping cart based upon a stored payment method associated with the loyalty account.

24. The non-transitory computer readable medium of claim 23 wherein the operations comprise inserting a recipe into the given chatbot conversation to be displayed on the remote device.

25. The non-transitory computer readable medium of claim 24 wherein the recipe has a plurality of ingredients; and wherein the chatbot conversation permits the given user to add the plurality of ingredients to the virtual shopping cart.

26. The non-transitory computer readable medium of claim 24 wherein the recipe has a plurality of ingredients; and wherein the at least one digital coupon is for one of the plurality of ingredients.

* * * * *